(No Model.)
J. BIRD.
WEIGHING SCALE ATTACHMENT.
No. 417,700. Patented Dec. 24, 1889.
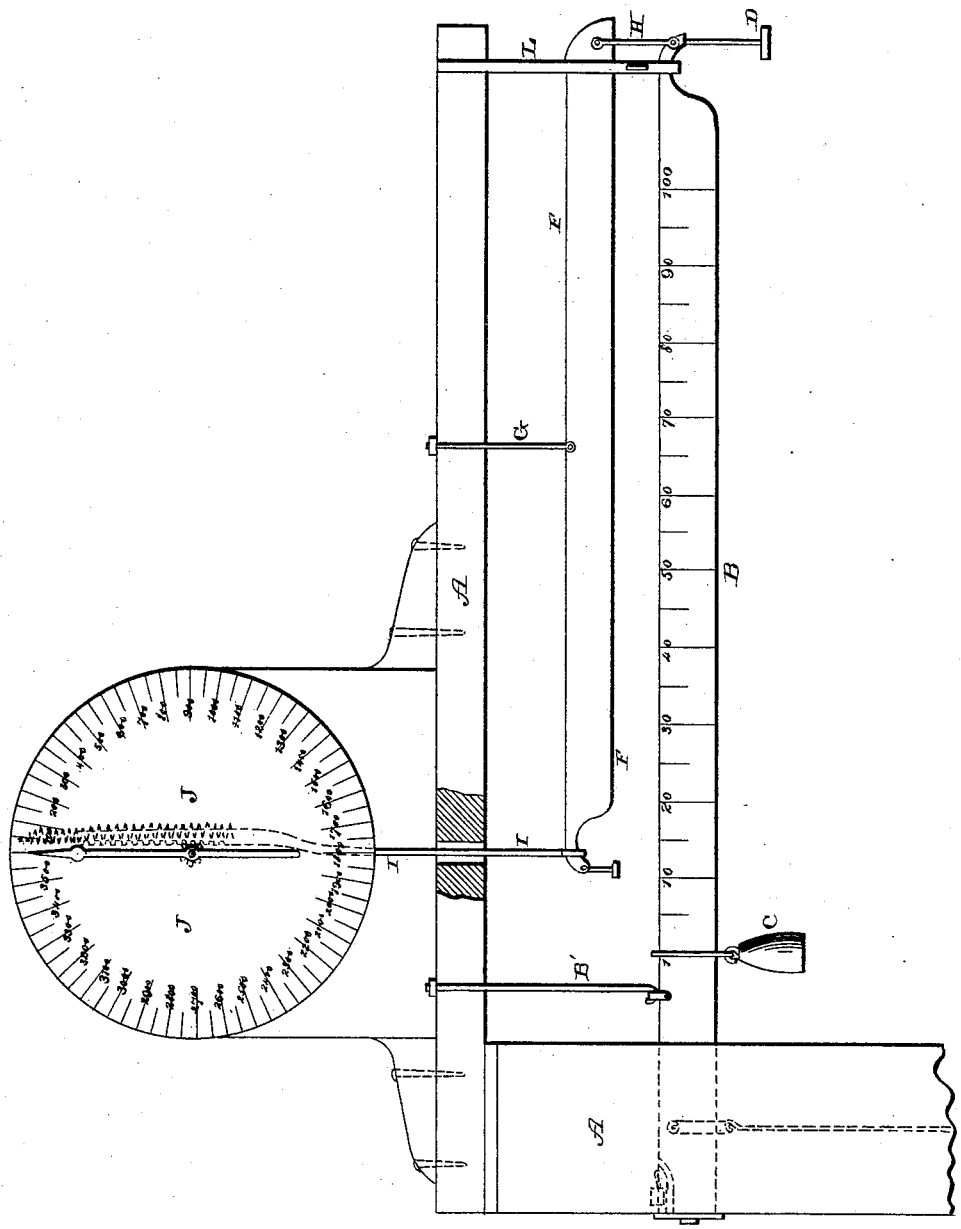
Witnesses:
E. P. Ellis,
L. L. Burket,
Inventor
Jno. Bird,
per
F. A. Lehmann,
Atty.

UNITED STATES PATENT OFFICE.

JOHN BIRD, OF WARREN, ILLINOIS.

WEIGHING-SCALE ATTACHMENT.

SPECIFICATION forming part of Letters Patent No. 417,700, dated December 24, 1889.

Application filed July 19, 1889. Serial No. 318,032. (No model.)

*To all whom it may concern:*

Be it known that I, JOHN BIRD, of Warren, in the county of Jo Daviess and State of Illinois, have invented certain new and useful Improvements in Scale Attachments; and I do hereby declare the following to be a full, clear, and exact description of the invention, such as will enable others skilled in the art to which it pertains to make and use it, reference being had to the accompanying drawing, which forms part of this specification.

My invention relates to an improvement in scale attachments; and it consists in the arrangement and combination of parts hereinafter described, and particularly pointed out in the claim.

The object of my invention is to provide an attachment which can be applied to any scale now in use without making any material changes in the scale itself, and by means of which the weight upon the platform is instantly indicated without having to move the poise back and forth upon the beam or to change the weights upon the end of the beam, as has heretofore been necessary.

The accompanying drawing represents a side elevation of a scale attachment which embodies my invention.

A represents the frame-work of the scale, B the beam, B' the hanger, C the poise, and D the weight-support, all of which are in common use.

In order to automatically weigh any object upon the platform, to do away with the adjustment of the poise upon the beam B, and to prevent the necessity of changing the weights at D, I place above the beam a counter-beam F, which is suspended upon knife-edge pivots at its center by the rod G, which is fastened at its upper end to the frame A. The two beams B F are connected together at their outer ends by the rigid connecting-rod H, which is provided with knife-edge bearings. To the inner end of the counter-beam F is connected the rod I, and this rod passes through the frame A, and is connected in any suitable manner at its upper end to the spring-scale J, which is provided with a numbered dial and hand or indicator in the usual manner. The outer ends of the beams B F pass through the depending loop L, in which they play up and down, as in the ordinary platform-scales.

When the weight is placed upon the platform, the poise C remains at figure 1, so as to balance the beam B, and then as the beam is moved by the weight upon the platform this weight is transferred through the rod H to the counter-beam F, and from the counter-beam the movement is transferred to the spring-scale J, which at once indicates the weight without any loss of time or any shifting of the weights, by which mistakes are so frequently made. This attachment is not intended for any particular make or pattern of scales, but is intended to be applied to any of the scales now in use having a horizontal frame above the scale-beam.

Having thus described my invention, I claim—

The combination, with an ordinary platform-scale beam and frame, of a counter-beam extending parallel therewith, a support connected to the horizontal portion of the frame and pivoted at the center of the counter-beam, a spring-scale placed upon the horizontal frame at or near its inner end, a rod connecting the outer ends of the scale and counter beams, and a rod connecting the inner end of the counter-beam and the spring-scale, all combined and operating in the manner substantially as described.

In testimony whereof I affix my signature in presence of two witnesses.

JOHN BIRD.

Witnesses:
 JAMES M. FRENCH,
 JOHN A. FRANCISCO.